United States Patent
Usui (10) Patent No.: US 6,668,163 B1
(45) Date of Patent: Dec. 23, 2003

(54) WIRELESS COMMUNICATION SYSTEM AND TERMINAL DEVICE

(75) Inventor: Takashi Usui, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/432,220

(22) Filed: Nov. 3, 1999

(30) Foreign Application Priority Data

Nov. 4, 1998 (JP) ............................... P10-313060

(51) Int. Cl.[7] ................................................ H04Q 7/20
(52) U.S. Cl. ................................ 455/234.1; 455/240.1
(58) Field of Search .............................. 455/70, 234.1, 455/239.1, 234.2, 67.4, 240.1, 242.1, 245.1, 250.1, 550.1, 517, 136, 138, 554.1, 554.2, 555; 370/252; 375/344, 345

(56) References Cited

U.S. PATENT DOCUMENTS

| | | | | |
|---|---|---|---|---|
| 4,222,118 A | * | 9/1980 | Dickinson et al. | 455/70 |
| 4,648,123 A | * | 3/1987 | Schrock | 455/67.4 |
| 5,170,392 A | * | 12/1992 | Riordan | 370/252 |
| 5,884,152 A | * | 3/1999 | Matsumoto | 455/234.1 |
| 5,930,231 A | * | 7/1999 | Miller et al. | 370/210 |
| 6,018,556 A | * | 1/2000 | Janesch et al. | 375/376 |
| 6,151,367 A | * | 11/2000 | Lim | 375/326 |
| 6,515,960 B1 | * | 2/2003 | Usui et al. | 370/203 |

FOREIGN PATENT DOCUMENTS

EP   0899920   3/1998   .......... H04L/12/64

* cited by examiner

Primary Examiner—Dwayne Bost
Assistant Examiner—Jean A Gelin
(74) Attorney, Agent, or Firm—Jay H. Maioli (57) ABSTRACT

To ensure AGC control with a quick response to each signal from any of a plurality of wireless communication terminal devices in a wireless LAN, AGC control is conducted by receiving signals from respective wireless terminals in control slots in one frame, detecting the signal level in a signal level detector circuit, then comparing it with a predetermined level in a level comparator circuit, and supplying the comparison value to VGA via a in loop filter.

In this case, control values are stored in RAM. Thus, by identifying the terminal under transmission and reading out a control value for the terminal under transmission, AGC control is executed. As a result, when the terminal under transmission changes from one to another the, AGC loop can quickly follow this change.

16 Claims, 7 Drawing Sheets

| AGC OF TERMINAL 1B | S-AGC 2 |
|---|---|
| AGC OF TERMINAL 1B | S-AGC 3 |
| ⋮ | ⋮ |

WIRELESS COMMUNICATION SYSTEM AND TERMINAL DEVICE

BACKGROUND OF THE INVENTION

1. Field of the Invention

This invention relates to a wireless communication system and a terminal device suitable for use in wireless LAN (local area network) connecting a plurality of terminal devices without lines.

2. Description of Related Art

Along with movements toward higher performances of computers, it is actively practiced to establish LAN by connecting a plurality of computers to share files and data or to transfer e-mails and data. In conventional LAN, computers are wire-connected by using optical fibers, coaxial cables, or twisted pair cables. However, wire LAN needs a wire connection work. Therefore, it is difficult to easily establish LAN, and cables extend complexly.

Thus, wireless LAN is being remarked as a system releasing users from wiring of conventional wire LAN. Recently, in particular, the use of information as multi-media has been progressed, and data having a large quantity such as image data and audio data and requiring high-speed transmission have come to be treated frequently. Taking it into consideration, the interface of IEEE1394 is being remarked, and there is a demand for wireless LAN available for wireless transmission of IEEE1394 data.

In case of establishing wireless LAN, wireless communication units are connected to computers and peripheral devices. The wireless communication unit transmits and receives data modulated by a predetermined modulation system to enable wireless transmission of data among wireless communication terminal devices, and controls the transmission procedure and the transmission timing of data among wireless communication terminal devices. CSMA/CA (carrier sense multiple access with collision detection) system is known as a system for controlling wireless LAN.

Conventionally, in such wireless LAN (local area network), in the case where a plurality of wireless communication terminal devices exist, since received signals from wireless communication terminal devices vary in signal intensity, it is necessary to re-adjust AGC (automatic gain control) for every wireless communication terminal device of a partner for exchanging data with. Conventionally, therefore, a symbol for AGC control is provided at a predetermined position in a frame to perform AGC control by detecting the symbol.

Figure 14:
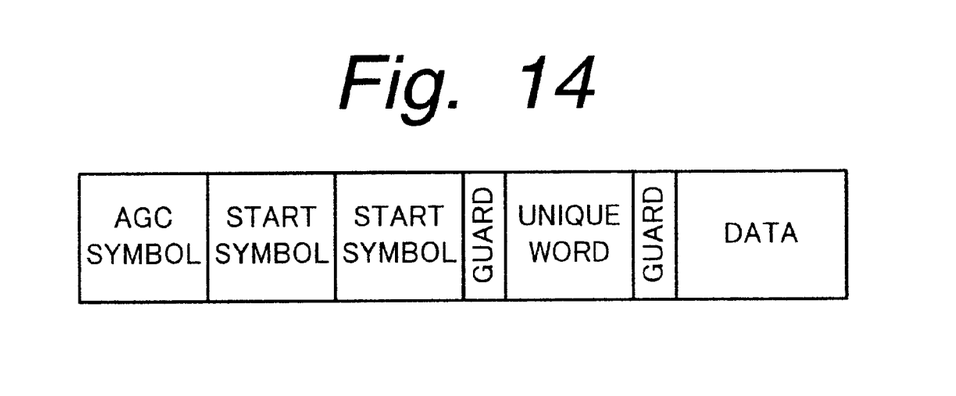
FIG. 14 is a schematic diagram for explaining a frame structure in conventional wireless LAN.

That is, FIG. 14 shows the structure of a single frame in a conventional wireless LAN. As shown in FIG. 14, a symbol for AGC is provided at the forefront of a frame. It is followed by start symbols and a unique word, and data is transmitted next to them.

In a wireless communication unit forming each wireless communication terminal device, when a signal is received from a wireless communication terminal device, the signal level of the received signal of the symbol for AGC at the forefront of a frame is detected. Then, the gain for the received signal is controlled so that the signal level of the received signal is a predetermined level. Controlled by such AGC control to equalize the signal level of the received signal to the predetermined level, data reception is executed.

In this manner, in conventional wireless LAN, the wireless communication unit forming each wireless communication terminal device needs the time for pulling in the AGC loop every time when a signal is received. This time not only results in wasting wireless resources but also invites an increase of the transmission delay time.

Especially, wireless LAN designed for wireless transmission of IEEE1394 data, a high speed is required. Therefore, it is desirable to reduce the time for AGC control and to increase the response speed. Additionally, the existence of the special symbol for ACE inevitably increases the overhead, and it is therefore desirable to omit the such special symbols.

OBJECTS AND SUMMARY OF THE INVENTION

It is therefore an object of the invention to provide a wireless communication system and a terminal device capable of increasing the response speed of an AGC circuit thereof to signals from a plurality of wireless communication terminal devices.

According to the invention, there is provided a wireless communication system having a plurality of terminal devices to make communication among these o devices in a time sharing fashion, in which each terminal device comprising: AGC control means for controlling so that the level of a received signal be a predetermined level; control value storage means for maintaining control values of the AGC control means for individual terminal devices under transmission; and transmitting terminal device identifying means for identifying a terminal device under transmission, the transmitting terminal device identifying means identifying a terminal under transmission, a control value corresponding to the terminal device under transmission being read out from the control value storage means and used as the control value of the AGC control means.

According to the invention, there is further provided a terminal device comprising: AGC control means for controlling so that the level of a received signal be a predetermined level; control value storage means for storing a control value of the AGC control means for each terminal device under transmission; and transmitting terminal deice identifying means for identifying a terminal under transmission, the transmitting terminal device identifying means identifying the terminal under transmission, the control value corresponding to the terminal device under transmission being read out from the control value storage means and used as the control value of the AGC control means.

According to the invention, there is further provided a terminal device comprising: a plurality of antenna means; antenna switching means for switching received outputs of the plurality of antenna means; AGC control means for controlling so that the level of a received signal be a predetermined level; and control value storage means for storing a control value of the AGC control means for each of the plurality of antennas, an antenna currently receiving a signal being identified from the plurality of antennas, one of control values corresponding to the antenna currently receiving the signal being read out from the control value storage means and used as the control value of the AGC control means.

For each terminal device currently under transmission, the AGC control value is stored in RAM. Thus, the terminal device currently engaged in transmission is judged, and a control value for the terminal device under transmission is read out from RAM to effect AGC control. As a result, even when the terminal device under transmission changes from one to another, the AGC loop can be followed at a high speed. Additionally, according to the invention, no special area for AGC is required in each frame, and the overhead is improved. Furthermore, when a diversity antenna is used, the AGC loop can be followed by storing AGC control values of individual antennas in RAM.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
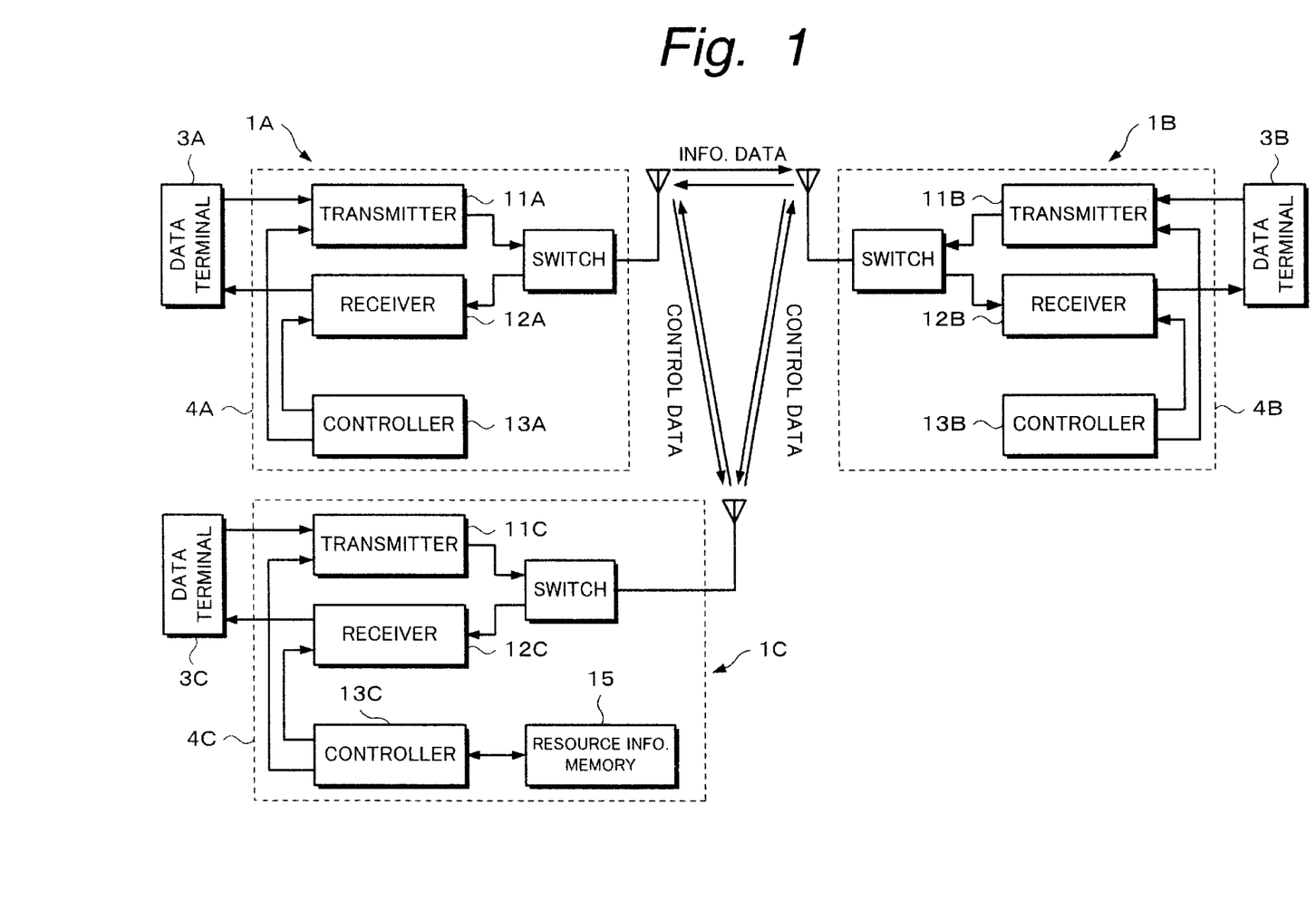
FIG. 1 is a block diagram showing structure of a wireless LAN system to which the invention is applied.

Explained below are embodiments of the invention with reference to the drawings. FIG. 1 shows a general aspect of a wireless LAN system to which the invention is applied. The wireless LAN system employing the invention includes a plurality of wireless communication terminal devices 1A, 1B, 1C . . . These wireless communication terminal devices 1A, 1B, 1C . . . are constructed by connecting wireless communication units 4A, 4B, 4C . . . to data terminals 3A, 3B, 3C . . . such as computers, for example. One of these wireless communication terminal devices 1A, 1B, 1C . . . is used as a control station, and the others are used as terminal stations. In the example shown here, the wireless communication terminal device 1C is the control station, and the other wireless communication terminal devices 1A, 1B, . . . are terminal stations.

Wireless communication units 4A, 4B, 4C . . . on the part of wireless communication terminal devices 1A, 1B, 1C . . . are made up of transmitters 11A, 11B, 11C . . . , receivers 12A, 12B, 12C . . . and controllers 13A, 13B, 13C . . . , respectively. The transmitters 11A, 11B, 1C . . . and the receivers 12A, 12B, 12C . . . are configured to engage in wireless data transmission of an OFDM (orthogonal frequency division multiplexing) system. The OFDM system is a system for transmitting data in a modulated form by using a plurality of orthogonal 1 carrier waves.

Figure 2:
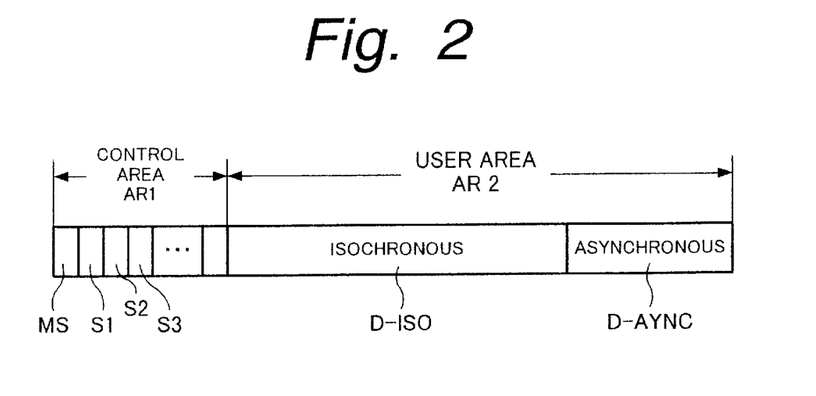
FIG. 2 is a schematic diagram for explaining a frame structure.

Data among individual wireless communication terminal devices 1A, 1B, 1C . . . are transmitted by a TDMA (time division multiple access) system within a frame. A single frame is as long as 4 msec, for example, and made up of a control area AR1 and a user area AR2 as shown in FIG. 2, for example. The control area AR1 is provided to send control data among respective terminal devices. Allocated to the forefront of the control area AR1 is a symbol MS for synchronization. Used as the symbol MS is a M series (maximum length code), for example. Subsequent to this, control slots S1, S2, S3 . . . for exchanging control data among individual wireless communication terminal devices are assigned.

The user area AR2 is used to transmit user data among different wireless communication terminal devices. the IEEE1394 interface supports the isochronous transmission mode and the asynchronous transmission mode. In the isochronous transmission mode, a delay time is secured, and high-speed data such as video data and audio data are transmitted. In the asynchronous mode, data such as commands which require reliable transmission and may disregard the delay time are transmitted.

To ensure transmission of data according to the IEEE1394 interface, the user area AR2 is divided into an isochronous data area D-ISO and an asynchronous data area D-ASYNC. The isochronous data area D-ISO and the asynchronous data area D-ASYNC are assigned to secure the region of the isochronous data area D-ISO and use the remainder region as the asynchronous data area D-ASYNC so that the user area can be used effectively.

In the wireless LAN system shown in FIG. 1, the wireless communication terminal device 1C functions as the control station for controlling the entire system, and the other wireless communication terminal devices 1A, 1B, . . . are used as terminal stations. For establishing the system, when the wireless communication terminal devices 1A, 1B, 1C, . . . are first started to operate by a supply of power, information on individual terminal devices are exchanged by using control slots S1, S2, S3, . . . in the control area AR1, and information about the wireless communication terminal devices 1A, 1B, . . . in the system is registered in the resource information memory 15 provided in the wireless communication terminal device 1C used as the control station.

Simultaneously, in the receivers 12A, 12B, 12C, . . . in the wireless communication units 4A, 4B, 4C, . . . forming the wireless communication terminal devices 1A, 1B, 1C, . . . , AGC control is executed. Once the pull-in of the AGC loop is completed, the AGC control value is stored for each received terminal device.

Figure 3:
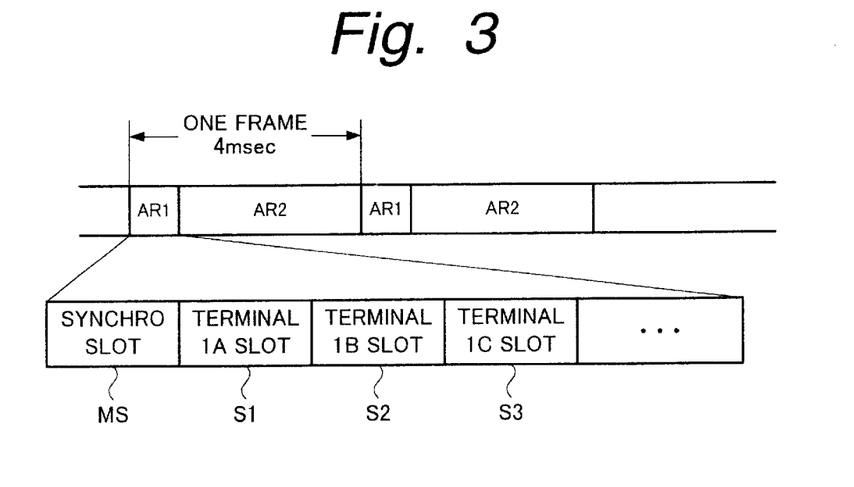
FIG. 3 is a schematic diagram for explaining control slots.
Figure 4:
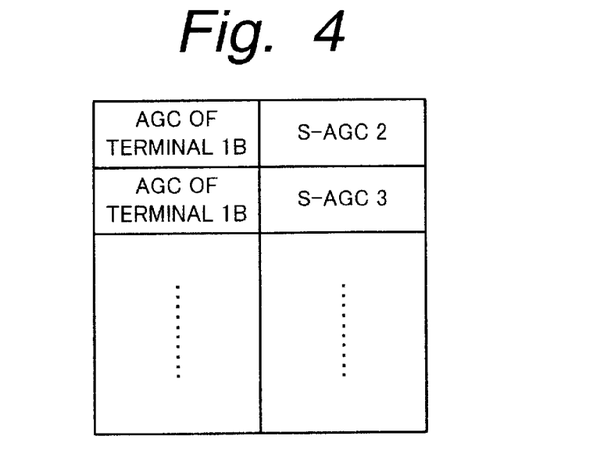
FIG. 4 is a schematic diagram for explaining control slots and AGC level detection.

That is, as shown in FIG. 3, for example, assume that the control slots S1, S2, S3, . . . are slots of control signals transmitted from the terminal devices 1A, 1B, 1C, . . . , respectively. The wireless communication terminal device 1A first executes AGC control by using the reception level of the signal in the control slot S2, and as shown in FIG. 4, it takes the AGC control value obtained thereby as an AGC control value D-ACG2 of the signal from the wireless terminal device 1B. After that, it executes AGC control by using the reception level of the signal in the control slot S3, and takes the AGC control value obtained thereby as an AGC control value S-ACG3 of the signal from the wireless terminal 1C. In this manner, taken into the wireless communication terminal device 1A are the AGC control values S-AGC2 and S-AGC3 obtained upon receiving signals from other terminal devices 1B, 1C, . . .

Similarly, the wireless communication terminal device 1B executes AGC control by using the reception levels of signals in the control slots S1, S3, . . . in the control area AR1, and takes AGC control values obtained thereby as AGC control values S-AGC1, S-AGC3, . . . upon receiving signals from other terminal devices 1A, 1C, . . . The wireless communication terminal device 1C performs AGC control by using received levels of signals in the control slots S1, S2, . . . in the control area AR1, and takes the AGC control values obtained thereby as AGC control values S-AGC1, S-AGC2, . . . upon receiving signals from other terminal devices 1A, 1B, When data is transmitted among different terminal devices, the wireless terminal device 1C as the control station is in charge of assigning slots and securing regions. Additionally, the wireless communication terminal devices 1A, 1B, 1C, . . . store AGC control values upon receiving signals from other terminal devices as explained above, and change these AGC control values, depending upon from which terminal device the currently received signal comes.

Figure 5:
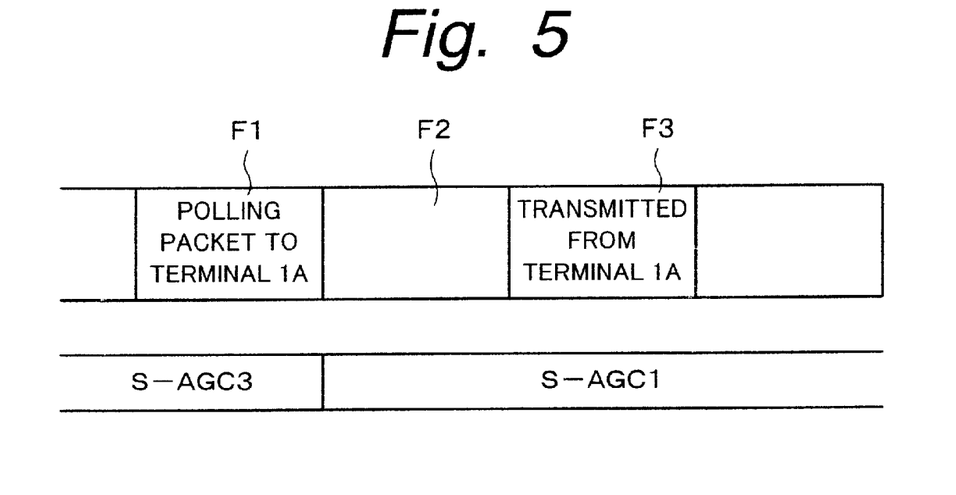
FIG. 5 is a schematic diagram for explaining switching among AGC control values.

For example, FIG. 5 shows an example of the control for changing AGC control values in case of a polling packet. Assume that FIG. 5 shows processing in the wireless communication terminal device 1B. The wireless communication terminal device 1B heretofore receives a signal from the wireless communication terminal device 1C as the control station. In this duration, the AGC control value is the control value S-AGC3 upon receiving the wireless communication terminal 1C as the control station.

Then, assume that the a polling packet is received in a frame F1. An address is written in the polling packet, and the next communication is transmitted from a terminal device identified by the address. In FIG. 3, in the polling packet in the frame F1, the wireless communication terminal device 1A is written. Therefore, in this case, the next AGC control value is changed to the control value S-AGC1 upon receiving the wireless communication terminal device 1A.

In this manner, in case of a polling packet, the AGC control value is changed depending on the received terminal device by receiving the polling packet and changing the AGC control value with reference to the address written in the polling packet.

Figure 6:
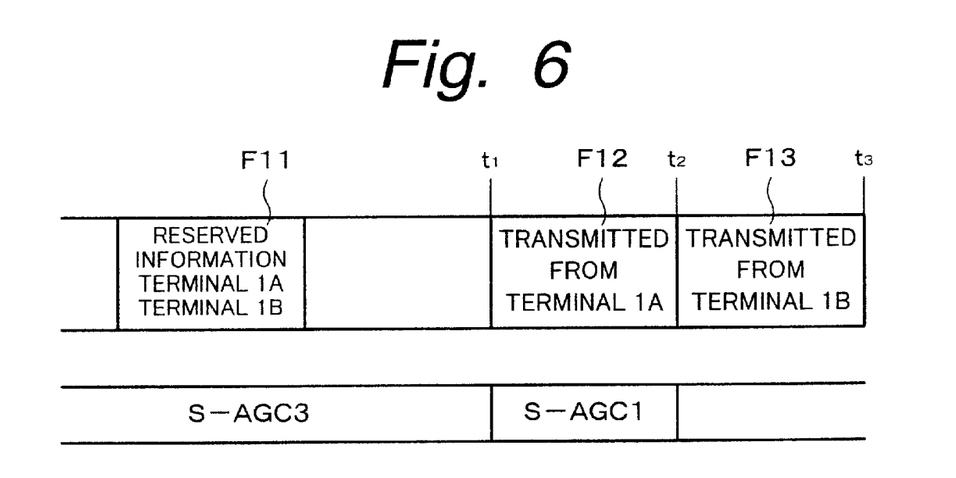
FIG. 6 is a schematic diagram for explaining switching among AGC control values.

FIG. 6 shows an example of the control for changing AGC control values in case of node assignment. Assume that FIG. 6 shows processing in the wireless communication terminal device 1B. The wireless communication terminal device 1B heretofore receives signals from the wireless communication terminal device 1C as the control station. In this duration, its AGC control value is the control value S-AGC3 upon receiving the wireless communication terminal device 1C. Then, assume that reserved information is received at a frame F11. Assume that it is written as the reserved information that there was transmission from the wireless communication terminal device 1A at the time from $t_1$ to $t_2$ and there was transmission from the wireless communication terminal device 1B at the time from $t_2$ to $t_3$.

In this case, the control value of next AGC is reset based on the content written in the reserved information, and at the time from $t_1$ to $t_2$, the AGC control value is switched to the control value S-AGC1 at the time or receiving the wireless communication terminal device 1A. Att the time of $t_2$~$t_3$, since the wireless communication terminal device 1B itself executes transmission, no AGC control value is set.

In this manner, in case of the node assignment system, AGC control values are changed in accordance with the terminal device transmitting a signal, by receiving reserved information and changing the AGC control value based on the content written on the reserved information. Then, AGC control is conducted from the received level of a signal in the control slot S1, S3, . . . of a terminal device transmitting the signal, and the AGC control value is renewed.

In this case, as shown in FIG. 3, AGC comes to follow every 4 msec corresponding to one frame. If the wireless LAN is used in a quasi-static environment such as home use, fluctuation of the signal level is not so large, and AGC control in this interval is acceptable. Needless to say, AGC may be conducted by using a signal in the user area AR2 or by using the received level of the symbol for synchronization MS.

In this manner, in case of polling, the terminal device currently under transmission can be identified by using polling information, and in case of node assignment system, the terminal device currently under transmission by using reserved information. Needless to say, the terminal device currently under transmission may be identified by combining polling information and reserved information.

Figure 7:
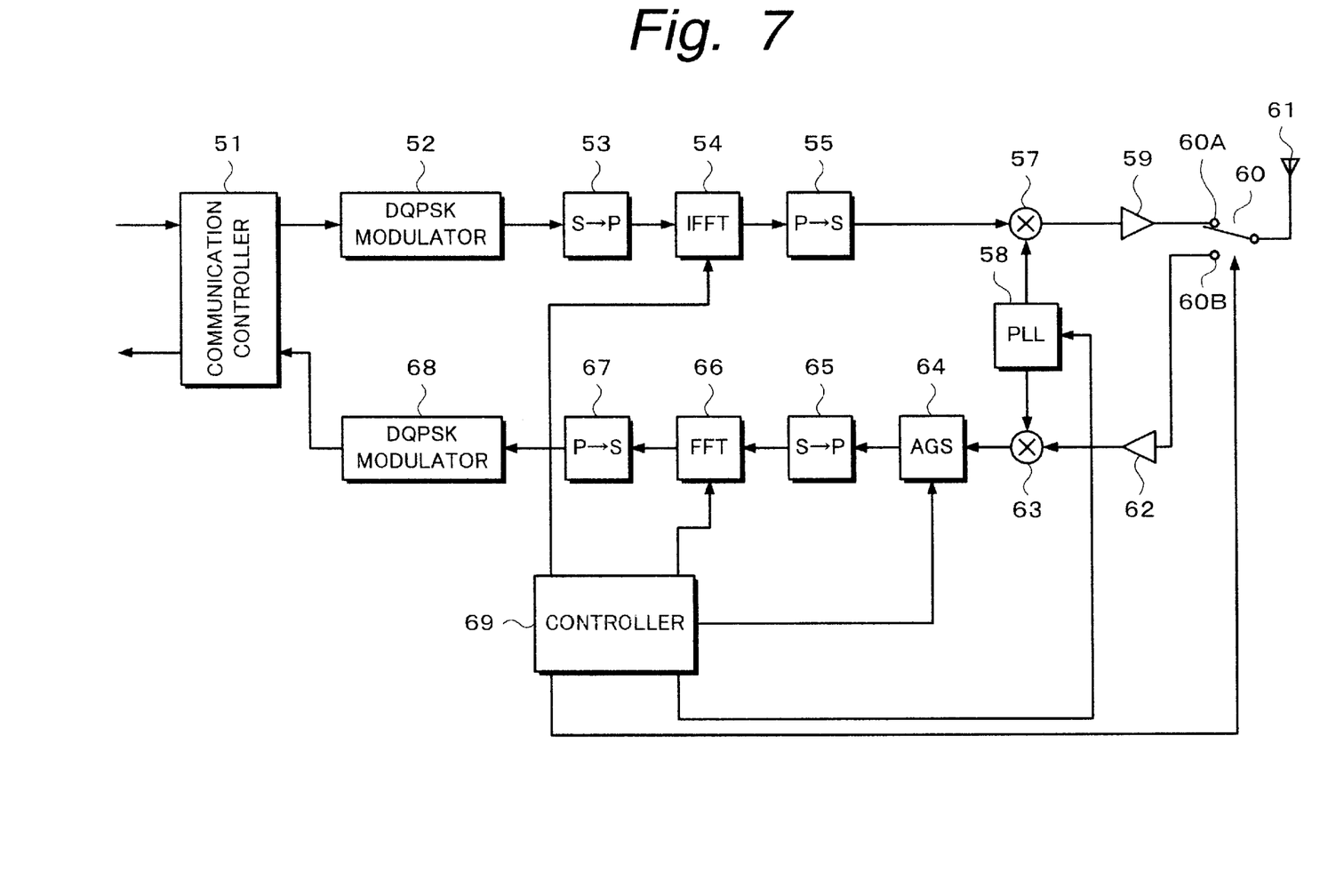
FIG. 7 is a block diagram of a wireless communication unit to which the invention is applied.

FIG. 7 shows the structure of the wireless communication unit 4A, 4B, 4C . . . in the wireless communication terminal device 1A, 1B, 1C . . .

In FIG. 7, transmitted data is inputted through a communication controller 51. Transmitted data from the communication controller 51 is supplied to a DQPSK modulator circuit 52. Transmitted data is DQPSK-modulated by the DQPSK (differentially encoded quadrature phase shift keying) modulator circuit 52.

Output from the DQPSK modulator circuit 52 is supplied to a serial/parallel converter circuit 53. In the serial/parallel converter circuit 53, serial data is converted into parallel data. Output from the serial/parallel converter circuit 53 is supplied to an IFFT (inverse fast Fourier transform) circuit 54. The transmitted data is mapped into data for a frequency region by the IFFT circuit 54, then converted by inverse Fourier transform, and converted into data for a time region. Output from the IFFT circuit 54 is supplied to a parallel/serial converter circuit 55.

The serial/parallel converter circuit 53, IFFT circuit 54, and parallel/serial converter circuit 55 convert a signal into a multi-carrier signal by OFDM (orthogonal frequency division multiplexing) system.

Output from the parallel/serial converter circuit 55 is supplied to a frequency converter circuit 57. The frequency converter circuit 57 is supplied with a local oscillator signal from a PLL synthesizer 58. The transmitted signal is converted into a predetermined frequency by the frequency converter circuit 57.

Output from the frequency converter circuit 57 is supplied to a power amplifier 59. The transmitted signal is power-amplified by the power amplifier 59. Output from the power amplifier 59 is supplied to a terminal 60A of a switch circuit 60. During data transmission, the switch circuit 60 is switched to the terminal 60A. Output from the switch circuit 60 is supplied to an antenna 61.

The received signal from the antenna 61 is supplied to the switch circuit 60. During data reception, the switch circuit 60 is switched to the other terminal 60B. Output from the switch circuit 60 is amplified through LNA (low noise amplifier) 62, and thereafter supplied to a frequency converter circuit 63.

The frequency converter circuit 63 is supplied with a local oscillator signal from a PLL synthesizer 68. The received signal is converted into an intermediate frequency signal by the frequency converter circuit 63. Output from the frequency converter circuit 63 is supplied to an AGC circuit 64. The AGC circuit 64 detects the signal level of the received signal, compares it with a reference level, and thereby controls so that the signal level of the received signal be constant.

The AGC circuit 64 includes a memory region for storing AGC control values of individual terminal devices. Then, during signal reception, an AGC control value corresponding to the terminal device currently under transmission is read out from the memory region. In this manner, by reading out the AGC control value corresponding to the terminal device currently under transmission from the memory region, the AGC loop can be pulled into quickly. Detection of the signal level of the received signal is executed by control slots S1, S2, . . . in the control area AR1 of one frame.

Output from the AGC circuit 64 is supplied to a serial/parallel converter circuit 65. Output from the serial/parallel converter circuit 65 is supplied to a FFT circuit 66. Output from the FFT circuit 66 is supplied to a parallel/serial converter circuit 67. The serial/parallel converter circuit 65, FFT circuit 66 and parallel/serial converter circuit 67 execute demodulation of OFDM system.

Output from the parallel/serial converter circuit 67 is supplied to a DQPSK demodulator circuit 68. In the DQPSK demodulator circuit 68, DQPSK demodulating processing is conducted. Output from the DQPSK demodulator circuit 68 is supplied to the communication controller 51. The received dat is output from the output of the communication controller 51.

The entire operations are controlled by a controller 69. Transmission of data and reception of data are controlled by the communication controller 51 according to instructions from the controller 69.

Figure 8:
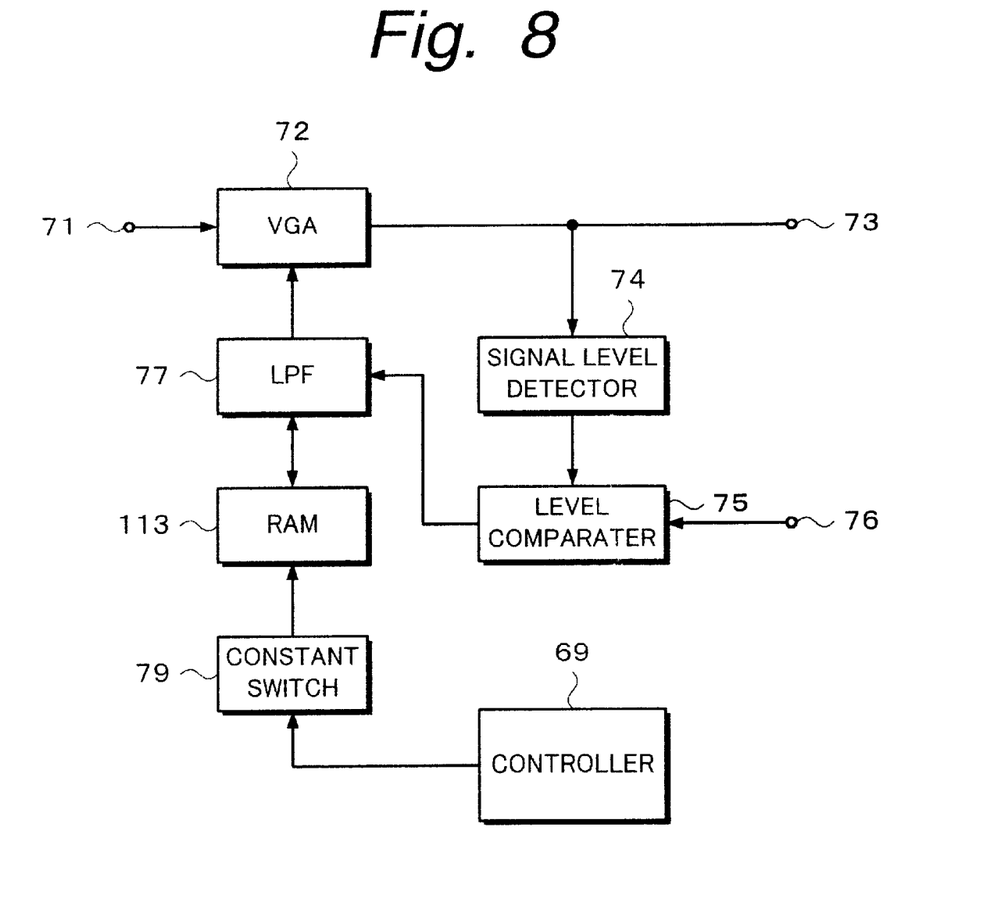
FIG. 8 is a block diagram of an AGC circuit in a wireless communication unit to which the invention is applied.

FIG. 8 shows a concrete structure of the AGC circuit 64. In FIG. 8, an intermediate frequency signal is supplied to an input terminal 71. The intermediate frequency signal from the input terminal 71 is supplied to VGA (variable gain amplifier ) 72. The gain of the variable gain amplifier 72 is varied in response to a preset value output from a loop filter 77.

Output from VGA 72 is output from an output terminal 73 and supplied to a signal level detector circuit 74. The signal level detector circuit 74 detects the signal level of the received signal, and outputs the detected value of the signal level in a digital value.

Figure 9:
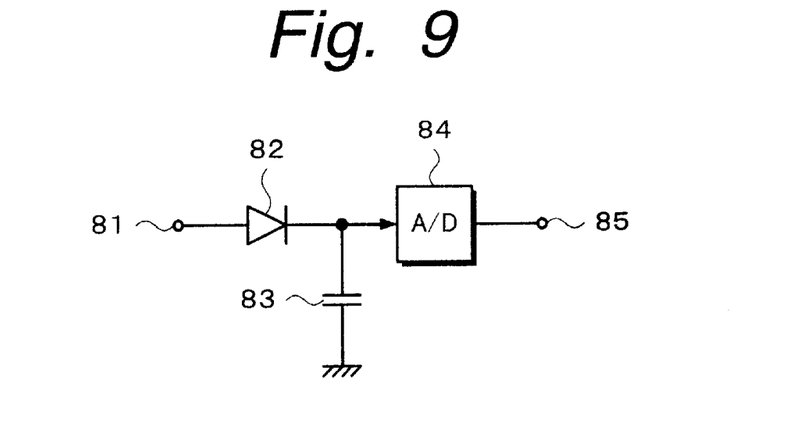
FIG. 9 is a block diagram of another example of signal level detector circuit of an AGC circuit in a wireless communication unit to which the invention is applied.

The signal level detector circuit 74 may be configured as shown in FIG. 9, for example, to detect the intermediate frequency signal from an input terminal 81 in a diode 82 in an analog form, then integrate it in an analog form in a capacitor 83, then change it into a digital form in an A/D converter 84, and output it from an output terminal 85.

Figure 10:
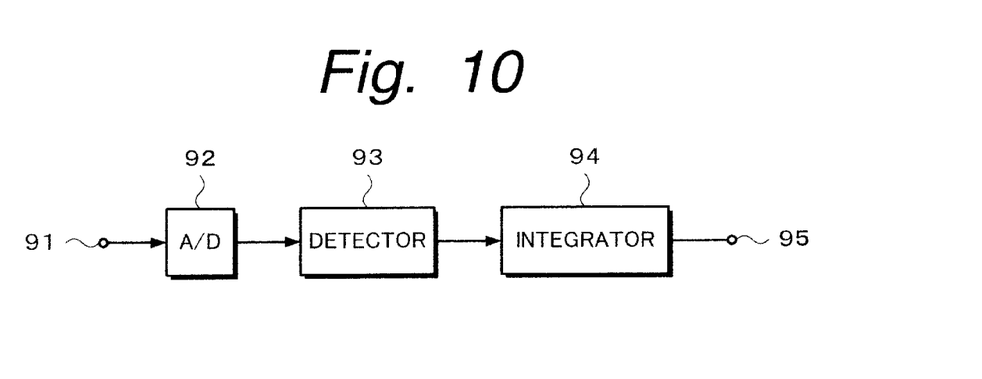
FIG. 10 is a block diagram of still another example of signal level detector circuit of an AGC circuit in a wireless communication unit to which the invention is applied.

Alternatively, as shown in FIG. 10, it may be configured to convert the intermediate frequency signal from an input terminal 91 into a digital form in an A/D converter 92, then detect it in a digital form in a digital detector circuit 93, then integrate it in a digital form in a digital integrator circuit 94, and output it from an output terminal 95.

Figure 11:
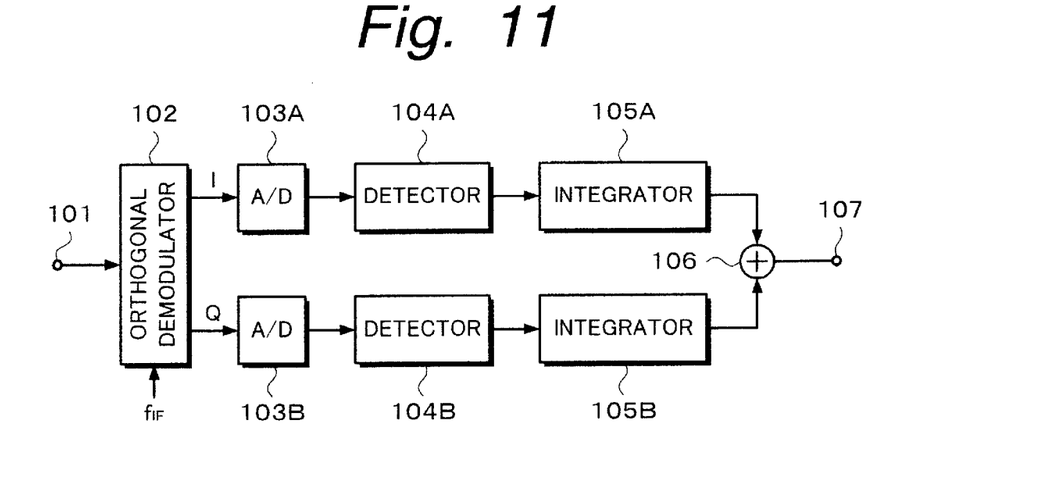
FIG. 11 is a block diagram of still another example of signal level detector circuit of an AGC circuit in a wireless communication unit to which the invention is applied.

It is also possible to configure the signal level detector circuit 74 as shown in FIG. 11 to supply the intermediate frequency signal from an input terminal 101 to an orthogonal demodulator circuit 102, demodulate the I signal and Q signal therefrom, convert the demodulated I signal and Q signal into digital forms in A/D converters 103A and 103B, respectively, then digitally detect them in digital detector circuits 104A and 104B, digitally integrate them in digital integrator circuit 105A and 105B, add them in an adder circuit 106, and output it from an output terminal 107.

In FIG. 8, output from the signal level detector circuit 74 is supplied to a level comparator circuit 75. The level comparator circuit 75 is supplied with a reference signal level from a terminal 76. In the level comparator circuit 75, the signal level of the received signal detected by the signal level detector circuit 74 is compared with the reference signal level from the terminal 76.

Figure 12:
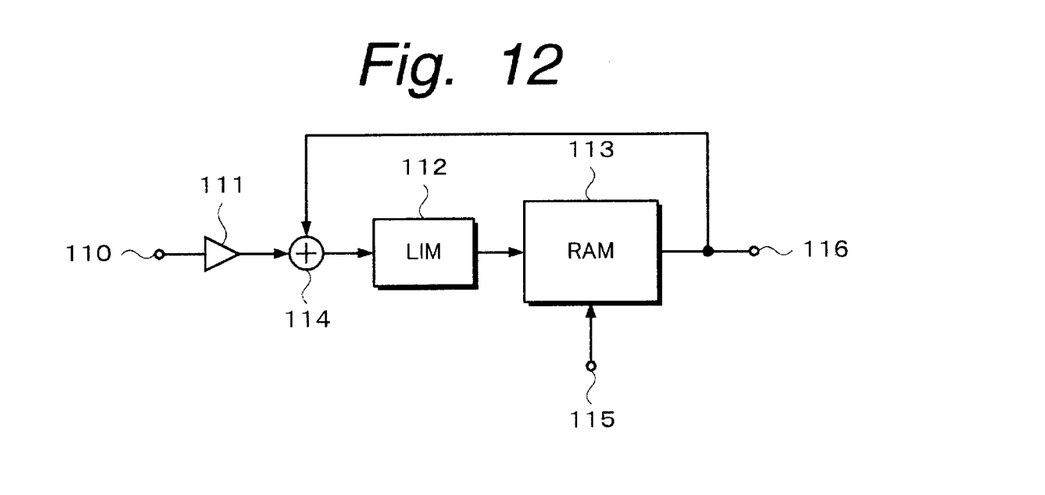
FIG. 12 is a block diagram of a loop filter in a wireless communication unit to which the invention is applied.

Output from the level comparator circuit 75 is supplied to a loop filter 77. The loop filter 77 is made up of a multiplier circuit 111, limiter circuit 112, RAM 113 and adder circuit 114 as shown in FIG. 12. A level comparison output from the level comparator circuit 74 is supplied to an input terminal 110. The level comparison output is supplied through the multiplier circuit 111 to the adder circuit 114. The adder circuit 114 is supplied with output from RAM (random access memory) 113. In the adder circuit 114, the input signal sent through the multiplier circuit 111 and output from RAM 113 are added. Output from the adder circuit 114 is supplied to RAM 113 via the limiter circuit 112. Output from RAM 113 is output from the output terminal 116, and fed back to the adder circuit 114.

In this manner, by multiplying the gain in the multiplier circuit 111 for the level comparison value from the input terminal 110, and accumulating such values, a loop is filter is constructed. The accumulated value is stored in RAM 113. The value stored in RAM 113 is used as the AGC control value.

RAM 113 is supplied with an address from the terminal 115. Based on the address, a storage region radio is determined in RAM 113. Therefore, by changing the address given to RAM 113, the AGC control value can be changed in accordance with the terminal device currently under transmission.

In FIG. 8, output from the loop filter 77 is supplied to VGA 72. The gain of VGA 72 is determined according to the output from the loop filter 77.

As explained above, RAM 113 is provided in the loop filter 77, and RAM 113 stores AGC control values of individual terminal devices currently under transmission. In the controller 69, the terminal device currently transmitting a signal is identified from the polling packet or reserved information. Based on the terminal device currently transmitting the signal, a switching signal is generated from the controller 69 toward the switching circuit 79. In response to the switching signal, an address corresponding thereto is sent from the switching circuit 79 to RAM 113. As a result, the AGC control value is changed in accordance with the terminal device currently transmitting the signal.

In this manner, when AGC control values are stored in digital forms in RAM 113, control values of individual terminal devices can be switched easily by merely changing the address. Needless to say, it is also possible to conduct AGC control in an analog form, store the AGC control signals in integrators for individual terminal devices, and change the integrators by switching circuit.

Although the foregoing example is configured to change AGC control values in accordance with the terminal devices currently transmitting the signal, if a diversity antenna is additionally used, AGC control values may be changed for every one of antennas used.

Figure 13:
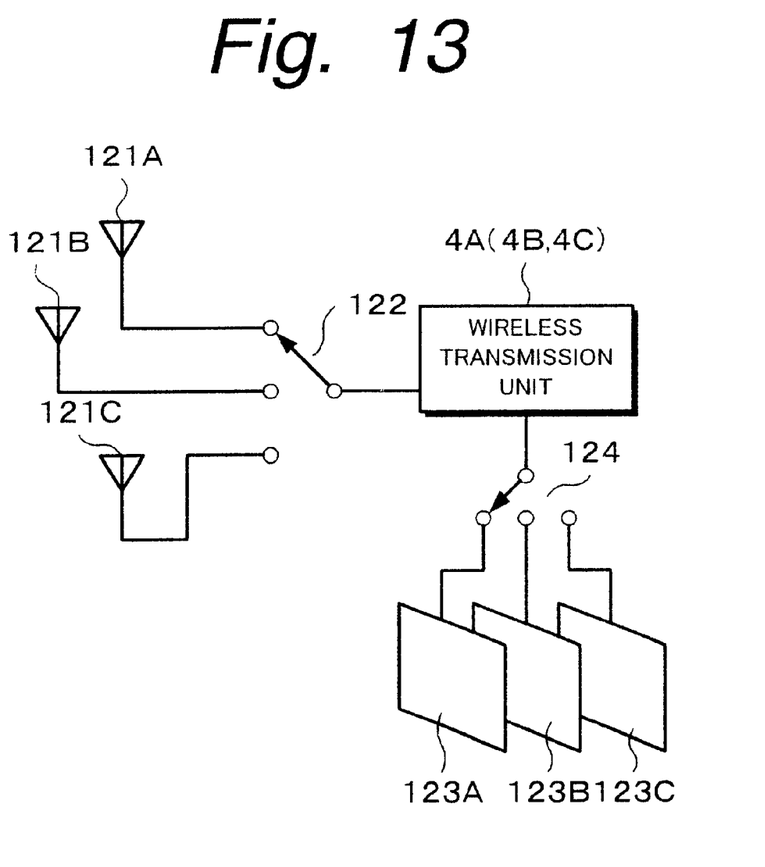
FIG. 13 is a block diagram for explaining another example of wireless communication unit to which the invention is applied.

That is, as shown in FIG. 13, three antennas 121A, 12B, 12C, for example, make up a diversity antenna. These antennas 12A, 121B, 12C can be switched from one to another by a switch 122.

Provided as memory for storing AGC control values are RAMs 123A, 123B, 123C for storing AGC control values corresponding to respective terminal devices when using the antennas 12A, 12B, 121C, respectively. RAMs 123A, 123B, 123C are switched from one to another by a switch circuit 124. RAMs 123A, 123B, 123C store AGC control values upon receiving signals transmitted from respective terminal devices, respectively.

Then, in accordance with the received condition, the antennas 12A, 121B, 121C are switched from one to another. In this case, it is judged which antenna is currently under reception, and in response to the result, RAM is switched to one to be used for AGC control by the switch circuit 124.

That is, when a signal is being received by using the antenna 121A, AGC control is executed by using RAM 123A. When a signal is being received by using the antenna 121B, AGC control is executed by using RAM 123B. When a signal is being received by using the antenna 121C, AGC control is executed by using RAM 123C.

Although the foregoing example uses three RAMs 123A, 123B, 123C and the switch circuit 124, it is also possible to divide a single RAM into three memory regions and store in individual memory regions AGC control values corresponding to respective terminal devices when using respective antennas 121A, 121B, 121C, respectively.

Further, although the foregoing example is configured to switch AGC control values in accordance with the terminal currently under transmission and the antenna currently used for reception, AGC control values may be changed merely through the currently receiving antenna.

According to the invention, AGC control is conducted for individual terminal devices under transmission, by storing AGC control values in RAM, identifying the terminal device under transmission, and reading out the control value for the terminal under transmission from RAM. As a result, even when the terminal under transmission changed from one to another, AGC loop can follow quickly. Additionally, according to the invention, no special region for AGC is required, and the overhead is improved. Moreover, when a diversity antenna is used, AGC loop can quickly follow the change of the terminal device by storing AGC control values in RAM for individual antennas.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A wireless communication system for communication among a plurality of terminal devices in a time sharing fashion, each of said plurality of terminal devices comprising:

AGC control means for controlling a level of a received signal to be a predetermined level;

control value storage means for maintaining control values of said AGC control means for ones of said plurality of terminal devices under transmission; and transmitting terminal device identifying means for identifying a terminal device of said plurality of terminal devices under transmission, wherein said transmitting terminal device identifying means identifies a terminal under transmission, and a control value corresponding to said terminal device under transmission is read out from said control value storage means and used as the control value of said AGC control means; and said control value storage means includes a storage unit that memorizes a value of a loop filter forming said AGC control means as said control value.

2. The wireless communication system according to claim 1 wherein said transmitting terminal device identifying means includes means to identify the terminal under transmission from polling information.

3. The wireless communication system according to claim 1 wherein said transmitting terminal device identifying means includes means to identify the terminal under transmission from reserved information.

4. The wireless communication system according to claim 1 wherein said transmitting terminal device identifying means includes means to identify the terminal under transmission from both polling information and reserved information.

5. The wireless communication system according to claim 1 wherein said AGC control means includes means to detect the level of the received signal in a slot in a predetermined control region in a wireless frame.

6. The wireless communication system according to claim 1 wherein said AGC control means includes means to detect the level of the received signal in a slot in a predetermined data region in a wireless frame.

7. The wireless communication system according to claim 1 wherein said AGC control means includes means to detect the level of the received of a predetermined synchronization signal in a wireless frame.

8. A terminal device as part of a plurality of terminal devices, comprising:

AGC control means for controlling a level of a received signal to be a predetermined level;

control value storage means for storing a control value of said AGC control means for each terminal device of the plurality of terminal devices under transmission; and transmitting terminal device identifying means for identifying a terminal device of the plurality of terminal devices under transmission, wherein said transmitting terminal device identifying means identifies the terminal device under transmission, and said control value corresponding to said terminal device under transmission is read out from said control value storage means and used as the control value of said AGC control means; and said control value storage means includes a storage unit that memorizes a value of a loop filter forming said AGC control means as said control value.

9. The terminal device according to claim 8 wherein said transmitting terminal device identifying means includes means to identify the terminal under transmission from polling information.

10. The terminal device according to claim 8 wherein said transmitting terminal device identifying means includes means to identify the terminal under transmission from reserved information.

11. The terminal device according to claim 8 wherein said transmitting terminal device identifying means includes means to identify the terminal under transmission from both polling information and reserved information.

12. The terminal device according to claim 8 wherein said AGC control means includes means to detect the level of the received signal in a slot in a predetermined control region in a wireless frame.

13. The terminal device according to claim 8 wherein said AGC control means includes means to detect the received signal level in a slot in a predetermined data region in a wireless frame.

14. The terminal device according to claim 8 wherein said AGC control means if includes means to detect the received level of a predetermined synchronization signal in a wireless frame.

15. A terminal device comprising:
 a plurality of antenna means;
 antenna switching means for switching received outputs of said plurality of antenna means;
 AGC control means for controlling a level of a received signal to be a predetermined level; and
 control value storage means for storing a control value of said AGC control means for each of said plurality of antennas, wherein
  an antenna currently receiving a signal is identified from said plurality of antennas, and one control value corresponding to said antenna currently receiving the signal is read out from said control value storage means and used as the control value of said AGC control means.

16. The terminal device according to claim 15 further comprising:
 transmitting terminal device identifying means for identifying a terminal device under transmission, wherein
  the terminal device under transmission is identified by said transmitting terminal device identifying means, an antenna currently receiving a signal is identified among said plurality of antennas, and one of control values corresponding to said terminal under transmission and said antenna currently receiving the signal is read out from said control value storage means and used as the control value of said AGC control means.

* * * * *